United States Patent [19]
Uchida et al.

[11] Patent Number: 5,239,539
[45] Date of Patent: Aug. 24, 1993

[54] CONTROLLER FOR DISTRIBUTING LOADS AMONG CALL PROCESSORS

[75] Inventors: Yoshihiro Uchida; Satoshi Kakuma; Shuji Yoshimura, all of Kawasaki; Yasuhiro Aso, Tokyo; Masami Murayama, Yokohama, all of Japan

[73] Assignee: Fujitsu Limited, Kawasaki, Japan

[21] Appl. No.: 671,921

[22] Filed: Mar. 19, 1991

[30] Foreign Application Priority Data

Mar. 20, 1990 [JP] Japan ............................... 2-070059

[51] Int. Cl.$^5$ .......................................... H04Q 11/04
[52] U.S. Cl. .................................. 370/58.3; 370/60; 379/269
[58] Field of Search ................ 370/13, 54, 58.1, 58.2, 370/58.3, 60, 60.1, 94.1; 379/242, 258, 268, 269, 271, 272, 279, 280, 284; 340/825.03, 826

[56] References Cited

U.S. PATENT DOCUMENTS

| | | | |
|---|---|---|---|
| 4,720,854 | 1/1988 | Sand .................................. | 379/269 |
| 4,827,499 | 5/1989 | Warty et al. ........................ | 379/269 |
| 5,048,011 | 9/1991 | Melen .................................. | 370/60 |
| 5,062,103 | 10/1991 | Davidson et al. .................. | 370/58.1 |
| 5,070,498 | 12/1991 | Kakuma et al. .................... | 370/60 |
| 5,084,867 | 1/1992 | Tachibana et al. ................. | 370/60 |

FOREIGN PATENT DOCUMENTS

| | | |
|---|---|---|
| 343611 | 11/1989 | European Pat. Off. . |
| 3629406 | 3/1988 | Fed. Rep. of Germany . |
| 3629466 | 3/1988 | Fed. Rep. of Germany . |
| 0343611 | 11/1989 | Italy . |
| 58-151666 | 9/1983 | Japan . |
| 63-191263 | 8/1988 | Japan . |

OTHER PUBLICATIONS

Turner, "Design of a Broadcast Packet Switching Network," IEEE Transactions of Communications, vol. 36, No. 6, pp. 734-743, New York.
A Broadband ATM Switching System, Koso Murakami et al., Electronics and Communications in Japan, 72 (1989) Dec., No. 12, Part I, New York, pp. 99-106.
Design of a Broadcast Packet Switching Network, Jonathan S. Turner, IEEE Transactions on Communications 36 (1988) Jun., No. 6 New York, pp. 734-743.
Electronic Switching, Groupe des Ingenieurs de Secteur Commutation du CNET, Studies in Communications, vol. 2, (1981) Amsterdam, pp. 263-290.

Primary Examiner—Douglas W. Olms
Assistant Examiner—Alpus H. Hsu
Attorney, Agent, or Firm—Staas & Halsey

[57] ABSTRACT

A main processor assigns originated-call processings to each of a plurality of call processors in the sequence of call originations according to the first principle of this invention. A switching state controller collects usage information about a plurality of buffers composing the switching network in the ATM exchanger. The call processors to which call processings are assigned perform the call processings based on the content of switching state controller a main processor assigns a call processing for an originated call to one of a plurality of call processors by referring to the call processing assignment table memory with the virtual channel identifier corresponding to an originated call according to the second principle of this invention thus, call processing loads are distributed among call processors.

10 Claims, 12 Drawing Sheets

Cxy : CROSSING POINTS OF ATM SWITCHING

FIG. 7

| | | |
|---|---|---|
| S 00 | C 00 | 75 |
| | C 01 | 20 |
| | C 10 | 120 |
| | C 11 | 40 |
| S 01 | C 00 | 40 |
| | ⋮ | ⋮ |
| S 12 | C 11 | 60 |
| MAX | | 150 |

FIG. 12

| INPUT VCI | CALL PROCESSOR NUMBER |
|---|---|
| 1 | 1 |
| 2 | 1 |
| 3 | 2 |
| 4 | 2 |
| 5 | 3 |
| 6 | 3 |

CONTROLLER FOR DISTRIBUTING LOADS AMONG CALL PROCESSORS

BACKGROUND OF THE INVENTION

1. Field of the Invention

This invention pertains to a broadband exchange and more particularly to a controller for distributing loads among a plurality of call processors for controlling a switching network used in a broadband exchange per an asynchronous transmission mode.

2. Description of the Related Art

With the widespread use of data communication, public switched networks are now required to provide high-quality data communication, as well as the traditional voice communication.

Broadband ISDN (B-ISDN) has begun to be utilized for communication networks not only for low-speed data, such as voice data, but also for high-speed data, such as moving images, and various interfaces have been standardized. Unlike the traditional switching method, a B-ISDN utilizing an asynchronous transmission mode (ATM) can commonly carry at different speeds various sorts of information, e.g. voice data, moving image data and even continuous information mixed with bursty information.

An ATM communication network transmits and exchanges information of different bands divided and housed in fixed-length data units called cells, instead of in variable-length packets as in traditional packet communication. Cells containing channel data and packet data are indiscriminately multiplexed, transmitted over optical fibers at high speed, and rapidly exchanged by hardware switches. Thus, an ATM communication network can offer flexible service requiring different transmission speeds and makes efficient uses of transmission paths.

As described above, user information is divided into several pieces according to its length and cells are configured by adding headers, e.g. of a few bytes, to respective data, e.g. of 32 to 120 bytes, comprising the divided pieces of information. A header contains a virtual channel identifier (VCI) for identifying the originating user of the corresponding data. Thus, user information stored in cells is multiplexed over ATM highways and transmitted and exchanged to a destined terminal.

An exchanger adds to input cell information as to how they should be exchanged in the exchange system, so that they are autonomously transmitted over a transmission path in the exchange network with their added header information read by respective switches in the exchanger. Hence, this switching method is called a self-routing method, and the group of switches within the exchanger is called a self-routing part.

FIG. 1 shows an exemplary configuration of a multi-stage self-routing part (MSSR) being a switching part in an ATM exchanger. The MSSR comprises plural [generally three (3)] stages of self-routing modules (SRMs) each comprising a plurality of input and output terminals. An ATM exchanger is equipped with two such MSSRs, as shown in FIG. 1, for both directions of data transmission.

FIG. 2 shows an exemplary configuration of an SRM shown in FIG. 1. An SRM has pluralities of input and output lines, and a crossing point of an input line and an output line is provided with a buffer. In FIG. 2, the SRM has four (4) input lines, four (4) output lines and sixteen (16) buffers at respective crossing points.

As described earlier, at the entrance of an MSSR, the respective input cells have added to themselves information, called tag information, as to which input line they are input to and which output line they are output from. Thus, tag information routes cells in an MSSR. For instance, when SRMs are connected in three (3) stages as shown in FIG. 1 and respective SRMs have four (4) output lines as shown in FIG. 2, respective input cells have added to themselves 6-bit tags comprising three (3) sets of 2-bit tags specifying which of the four (4) output lines is selected for outputting corresponding to the three (3) SRM stages.

Meanwhile, as described earlier, the header of each input cell has added to itself a VCI for identifying the originating user of the cell. This VCI is defined for respective logical links among exchangers. Therefore, the header of an input cell from an originating user has added to itself the VCI specifying the link with the exchanger of the preceding stage, over which link the cell is transmitted. The respective exchangers replace the VCI added to the header of an input cell with the new VCI specifying the link with the exchanger of the succeeding stage, over which link the cell is transmitted. Thus, cells are sequentially transmitted to a plurality of exchangers towards a destined terminal.

A part called a Virtual Channel Converter (VCC) in the MSSR of an exchanger performs the above two processes, i.e. replacing VCIs and adding tag information, for the input cells. The new VCI for replacing the old VCI attached to an input cell and the new tag information for replacing the old tag information are uniquely determined by the old VCI. Accordingly, a VCC is provided with a conversion table enabling it to obtain, from the old VCI of an inputted cell, the new VCI to be added to the input cell when it is output and the tag information.

When a user originates a call, a call processor determines, based on the traffic condition in the entire ATM network, the content of a VCC conversion table for obtaining, from the old VCI, the appropriate tag information and the new VCI, which specify the optimal transmission path for the cells of the originated call. Hence, the larger the MSSR and the more SRM stages it contains, the more complex the processes the call processor must perform.

As such, if one call processor performs all the processes for all incoming calls, which is ordinarily considered for all processings, the network's response degrades.

An ordinary solution to such a problem is to distribute load among a plurality of call processors. However, there has been no known load distribution controlling method for effectively controlling MSSRs comprising plural stages of SRMs. When an MSSR comprises three (3) SRM stages, for instance, three (3) processors may share the switching control in respective stages. However, since the switch loads in respective stages are not uniform, a crucial problem still remains as to how efficiently a switching can be performed by distributing loads equally among all call processors.

SUMMARY OF THE INVENTION

This invention is conceived based on the above background and aims at controlling the switching network of an ATM exchanger by uniformly distributing loads among a plurality of call processors.

It is premised on a device for controlling the load distribution among a plurality of call processors by controlling the switch network in an ATM broadband exchanger.

The first principle of this invention utilizes a first call processing assignor and a switching state controller, which are discussed below, and a call processor to which is assigned a call processing by the first call processing assignor, which performs call processings according to the control state of the switching state controller.

That is, the first call processing assignor assigns the call processing for an originated call to a plurality of call processors in the sequence of call originations. The switching state controller controls the respective usage of a plurality of buffers composing or comprising a switching network.

The second principle of this invention utilizes a call processing assignment table memory and a second call processing assignor, discussed below, as well as a switching state controller similar to that utilized in the first principle of this invention, and the call processor to which is assigned a call processing by the second call processing assignor, which performs call processings according to the control state of the switching state controller.

That is, the call processing assignment table memory memorizes a table specifying which call processor performs the call processing corresponding to the channel identifier to be attached to the cells in an originated call. The second call processing assignor assigns the call processing for the originated call to one of a plurality of call processors by referring to the call processing assignment table memory with the channel identifiers corresponding to the originated calls.

The second principle can be varied to further involve an updater for updating the content of the call processing assignment table memory according to the control state of the switching state controller.

To summarize, the first and second principles of this invention enable efficient load distributions by assigning call processings to a plurality of call processors for controlling the switching network of an ATM switcher respectively in the sequence of call originations and by the channel identifiers attached to the respective cells of the originated calls.

BRIEF DESCRIPTION OF THE DRAWINGS

Those in the same field can easily understand additional purposes and features of this invention from the descriptions of the principles and the preferred embodiments of this invention together with the attached drawings. In the drawings.

FIG. 7 shows an embodiment of a switching state control table (SST);

FIG. 12 shows an embodiment of a call processing assignment table provided in a memory of an MPR according to the second principle of this invention.

DESCRIPTION OF THE PREFERRED EMBODIMENTS

Figure 1:
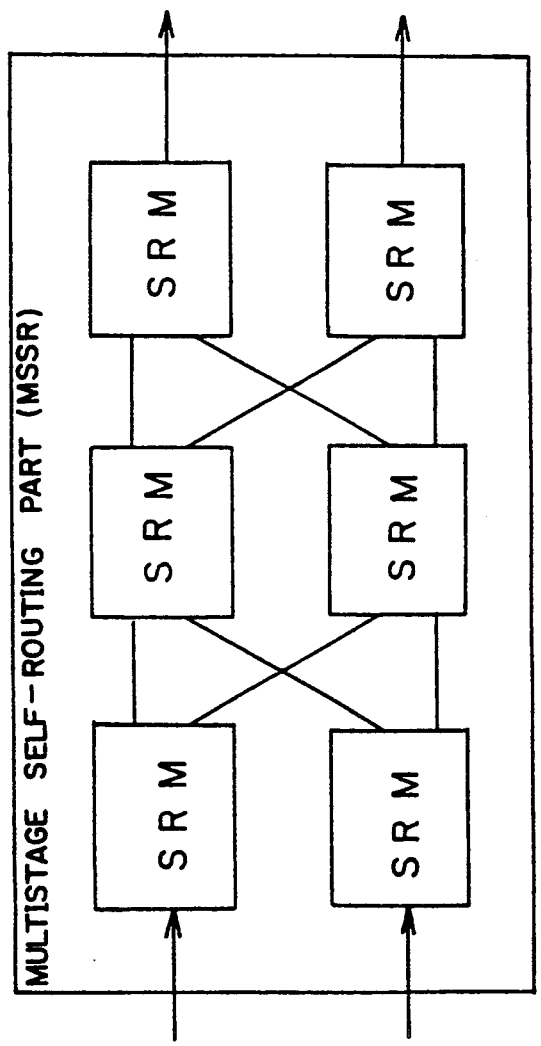
FIG. 1 shows an exemplary configuration of a multi-stage self-routing part in an ATM exchanger.
Figure 2:
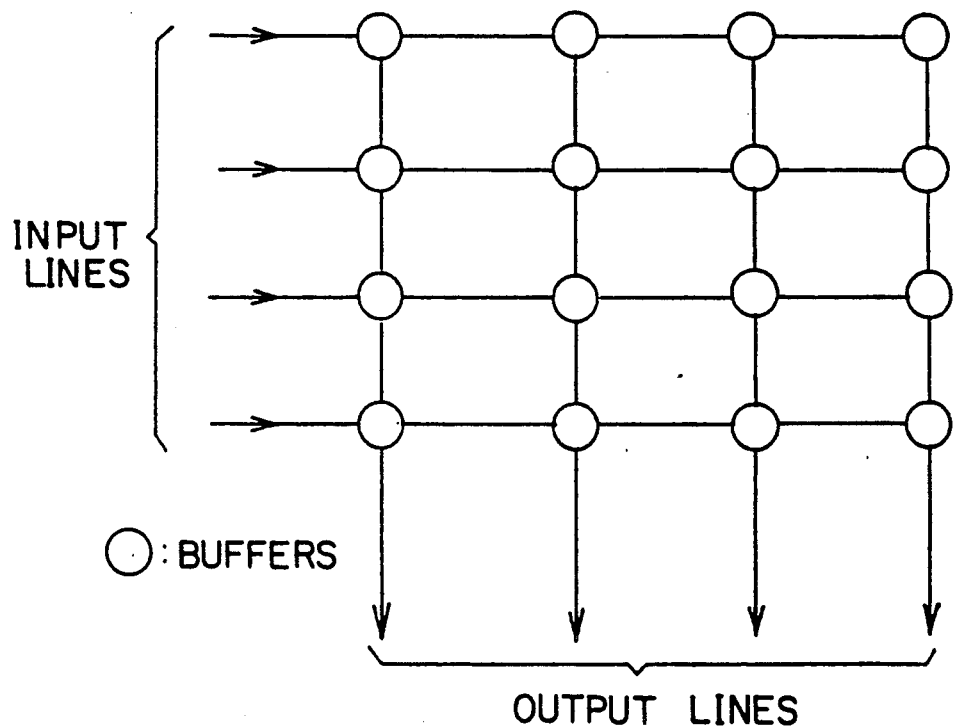
FIG. 2 shows an exemplary configuration of a self-routing module.
Figure 3A:
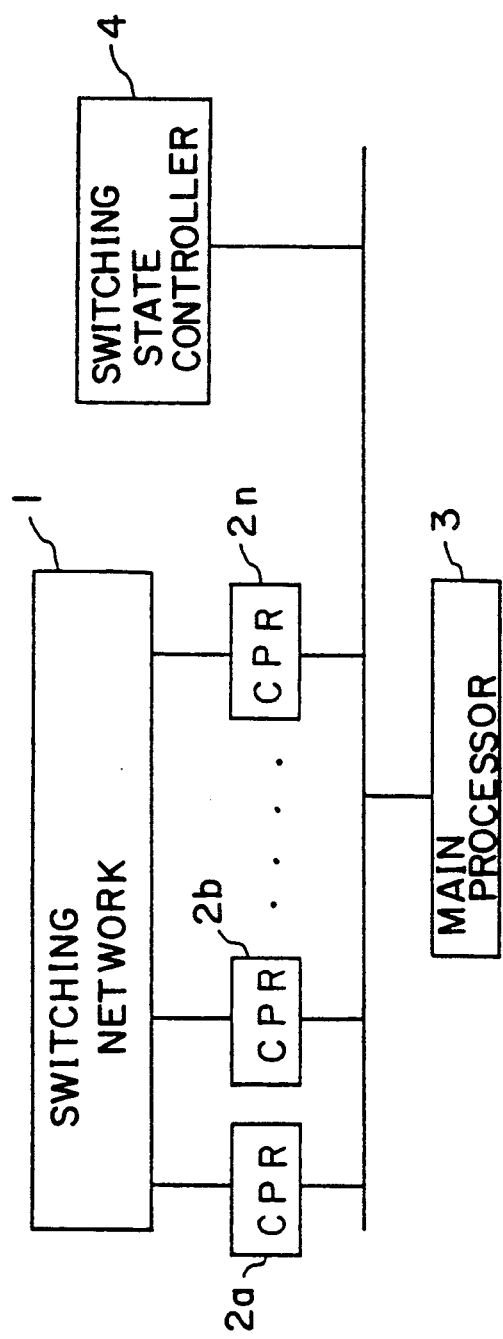
FIG. 3A is a block diagram illustrating the first principle of this invention.
Figure 3B:
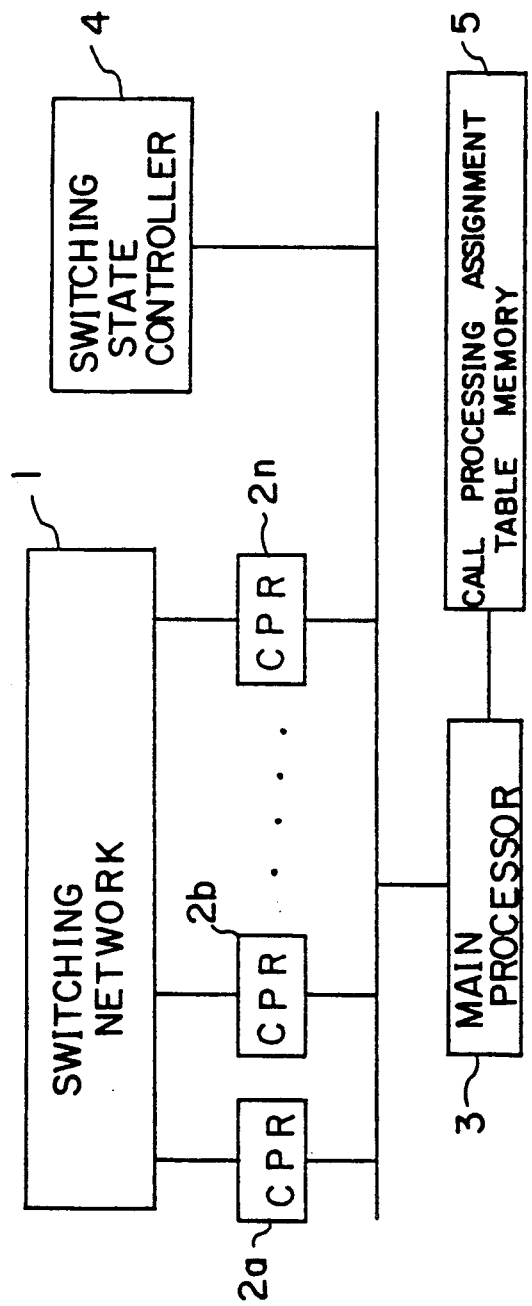
FIG. 3B is a block diagram illustrating the second principle of this invention.

Before describing the preferred embodiments of this invention, its principles are explained by referring to FIGS. 3A and 3B. This invention pertains to a method for controlling load distribution among a plurality of call processors (CPRs) 2-1 through 2-N, and for controlling a switching network 1, provided in an asynchronous transmission mode (ATM) exchanger.

FIG. 3A is a block diagram illustrating the first principle of this invention. In FIG. 3A, a main processor (MPR) 3 sequentially assigns call processings for call-ups to CPRs 2-1 through 2-N in the call-up origination sequence. A switching state controller 4 collects usage information about a plurality of buffers composing or comprising the switching network 1 in the ATM exchanger.

FIG. 3B is a block diagram illustrating the second principle of this invention. As shown, a call processing assignment table memory 5 is provided, e.g. in a memory of the MPR 3, for memorizing which CPR performs the call processing corresponding to respective channel identifiers attached to the cells in an originated call. The switching state controller 4 shown in FIG. 3B operates similarly to that shown in FIG. 3A. By referring to the call processing assignment table memory 5 with the channel identifier corresponding to an originated call, the MPR 3 assigns a call processing for the originated call to one of the CPRs 2-1 through 2-N. Further, for uniformly distributing loads among CPRs 2-1 through 2-N, the MPR 3 periodically updates the contents of the call processing assignment table 5 based on the information stored in the switching state controller 4.

According to either the first or second principle of this invention, the MPR 3 integrally controls the assignment of call processings to CPRs 2-1 through 2-N for controlling the switching network 1 in the ATM exchanger either in the call-up origination sequence or by the channel identifiers attached to the cells, so that loads are distributed uniformly among CPRs 2-1 through 2-N, which route cells of the originated call based on the information stored in the switching state controller.

DESCRIPTION OF THE PREFERRED EMBODIMENTS

Figure 4:
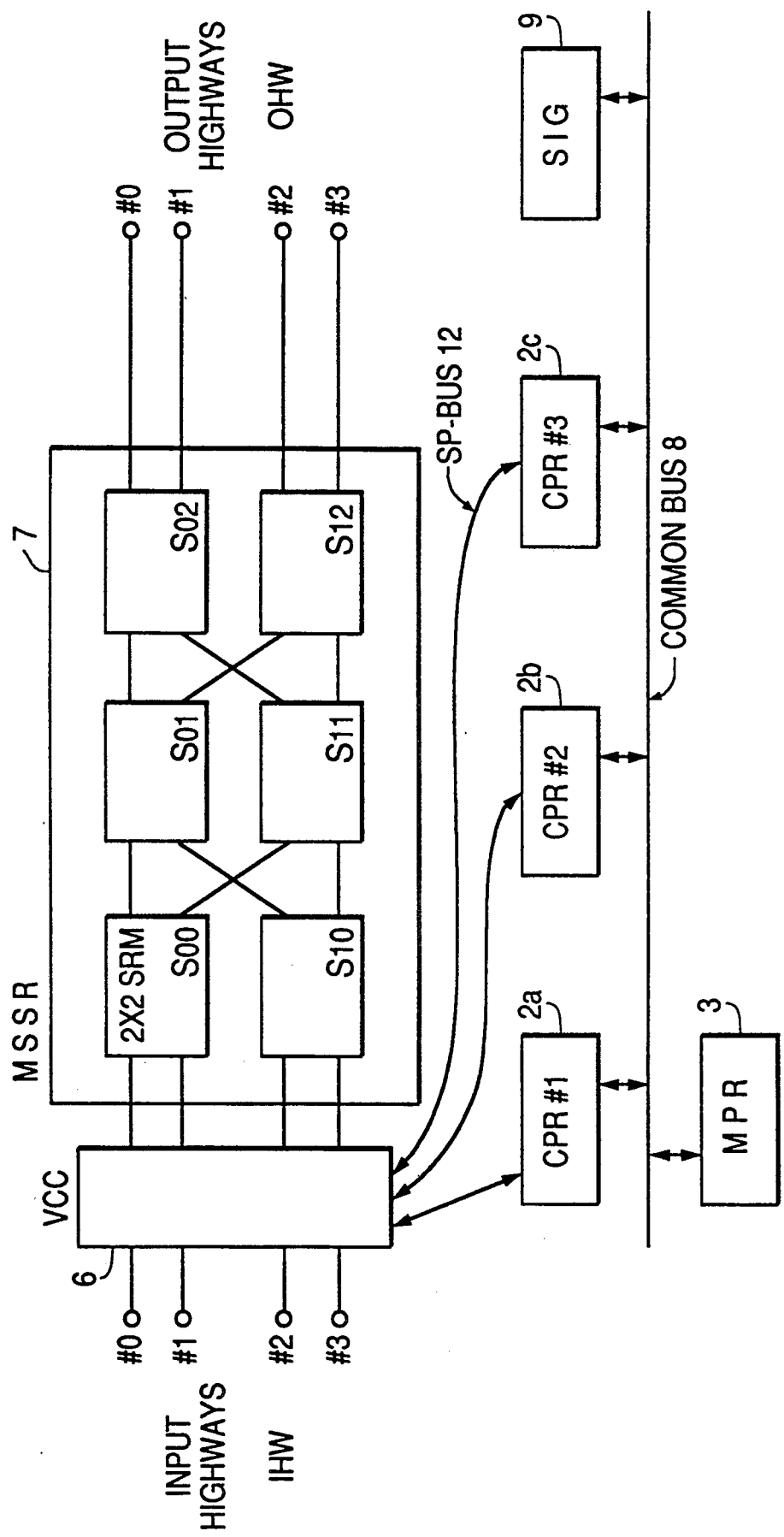
FIG. 4 is a block diagram illustrating the schematic configuration of an exemplary ATM exchanger embodying this invention.

The preferred embodiments of this invention are explained in more detail, below. FIG. 4 is a block diagram illustrating the schematic configuration of an exemplary ATM exchanger embodying this invention.

In FIG. 4, a VCI converter (VCC) 6 replaces the virtual channel identifier (VCI) in an ATM cell corresponding to the link with the exchanger in the preceding stage, with the VCI corresponding to the link with the exchanger in the succeeding stage, and adds to the ATM cell a tag giving routing information in a multistage self-routing part (MSSR) 7 comprising plural stages of self-routing modules (SRMs).

Three call processors (CPRs) 2a, 2b and 2c, as well as a signaling device (SIG) for detecting a call origination, are connected to a common bus 8 and controlled by the main processor (MPR) 3.

Figure 5:
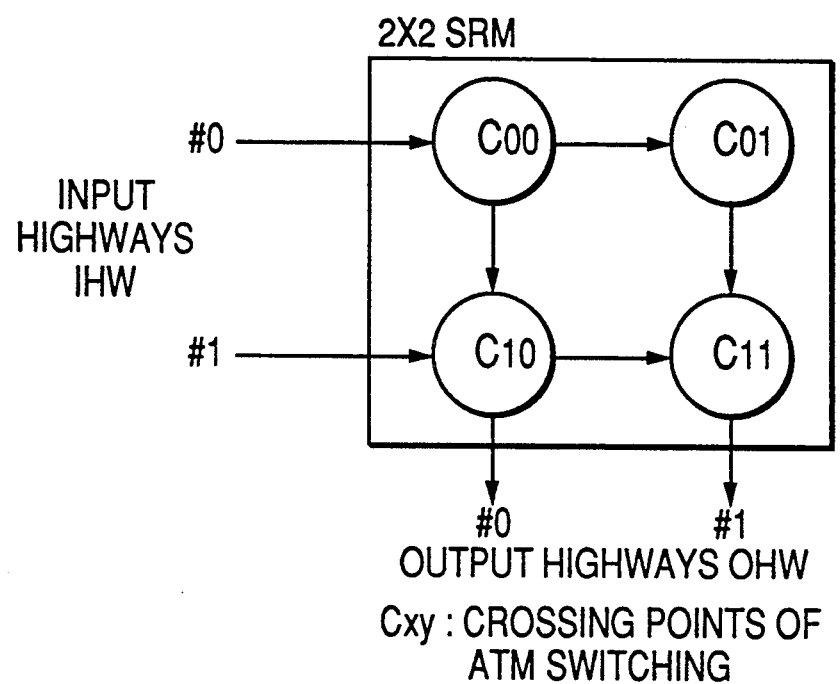
FIG. 5 is a block diagram illustrating the configuration of an exemplary self-routing module embodying this invention.

FIG. 5 is a block diagram illustrating the configuration of an exemplary self-routing module embodying this invention.

In FIG. 5, self-routing modules (SRMs), composing the MSSR 7 shown in FIG. 4, comprise four (4) buffers at 2*2 crossing points $C_{00}$ through $C_{11}$, where ATM cells are exchanged by switching ATM cells input from input highways IHW #0 and #1 to output highways OHW #0 and #1.

Figure 6:
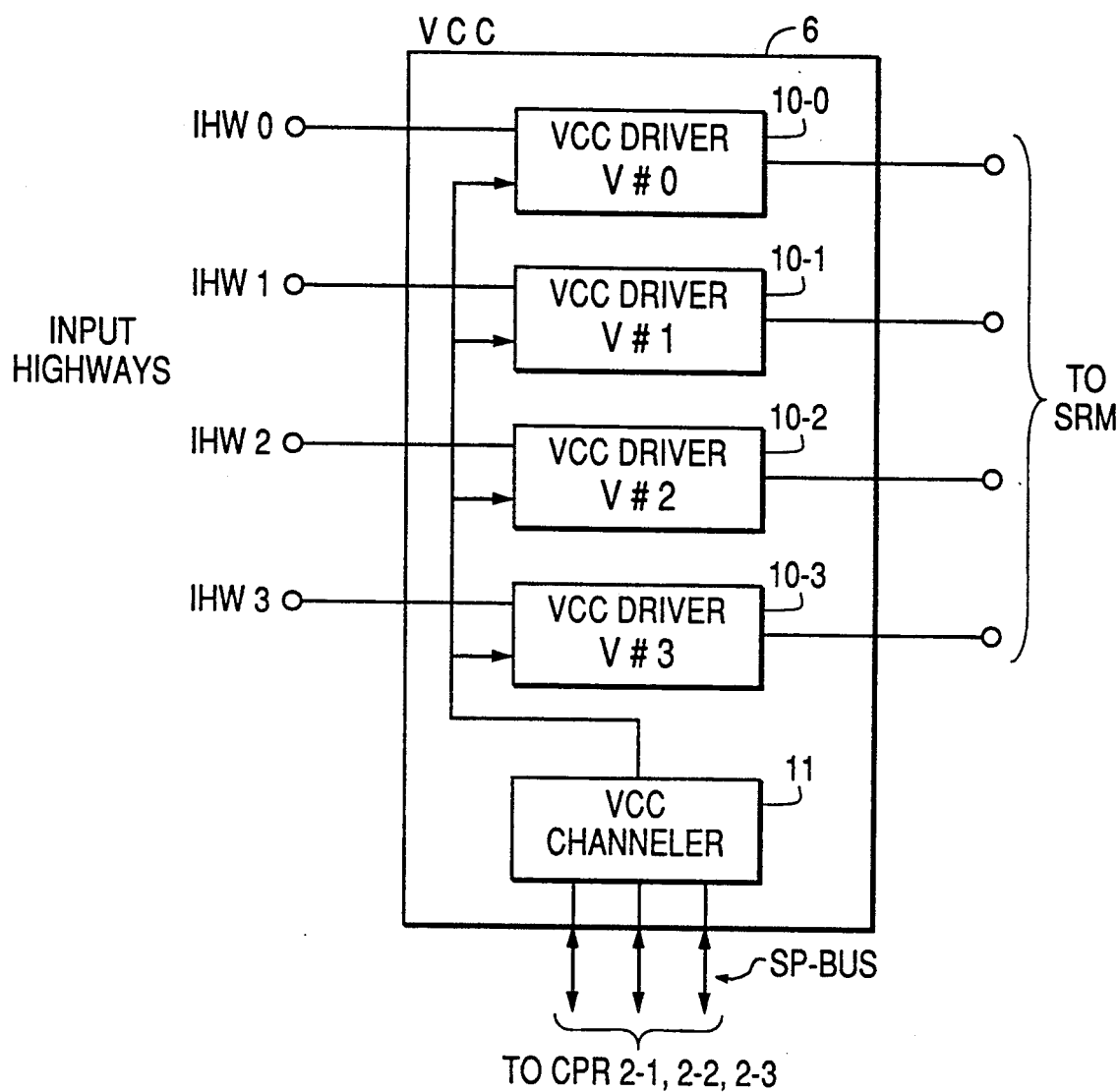
FIG. 6 is a block diagram illustrating the configuration of an exemplary VCI converter (VCC) embodying this invention.

FIG. 6 is a block diagram illustrating the configuration of an embodiment of the VCI converter (VCC) 6 shown in FIG. 4. The VCC 6 comprises VCNVs (VCC driver) 10-0 through 10-3 for converting VCI and attaching tag information to the cells input from input highways IHW0 through IHW3 according to an instruction from CPR2 and a VCCC (VCC channeler) 11 for interfacing between respective VCNVs 10-0 through 10-3 and respective CPRs 2-1, 2-2 and 2-3.

The MPR 3 shown in FIG. 4 is provided with a bandwidth controller (BWC) which corresponds to the switching state controller 4 shown in FIGS. 3A and 3B. An originating terminal making a call connection request notifies the exchanger of the information on the bandwidth occupied by the call together with the information on the destination terminal. The BWC controls the switching state by tracking the information on the bandwidth occupation, e.g. values such as 64 Kbps for a voice transmission and 50 Mbps for a moving image transmission, from the originating terminal and information on the path over which the cells of the call are routed in the MSSR 7 when the call is actually connected, instead of by monitoring the actual usage of the buffers in the switching network. Through such software processing controls, the BWC easily realizes the switching state.

FIG. 7 shows an embodiment of a switching state control table (SST) retained in the above described band information controller (BWC). The SST is retained in a memory (not shown in the drawings) and contains the sums of the bandwidths of the calls currently being switched for the twenty-four (24) combinations of SXY (in the respective SRMs $S_{00}$, $S_{01}$, $S_{02}$, $S_{10}$, $S_{11}$ and $S_{12}$ each comprising 2*2 buffers) and $C_{LM}$ (at the respective crossing points $C_{00}$, $C_{01}$, $C_{10}$ and $C_{11}$) and the maximum value MAX of the back widths switchable at a particular crossing point (of an input line and an output line in an SRM). In the example of this embodiment shown in FIG. 7, the MAX is set to 150 Mbps and 75 Mbps bandwidth is currently being used for switching calls at crossing point $C_{00}$ in SRM $S_{00}$. Since the MAX is greater than the sum of the bandwidths of the calls currently being switched at crossing point $C_{00}$ in $SRM_{00}$, additional calls having total bandwidths of 75 Mbps can be switched at this particular crossing point.

Whereas the basic configuration of this invention is described as above, call processing assignments are embodied according to the first or second principle of this invention described earlier.

The embodiment of call processing assignments according to the first principle are now explained in detail.

Figure 8:
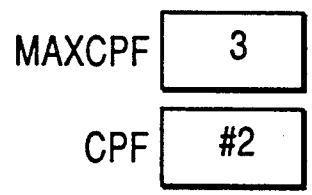
FIG. 8 shows exemplary data, for assigning call processing according to the first principle of this invention, stored in a memory (not shown) of an main processor (MPR)

FIG. 8 shows exemplary data, for call processing assignments according to the first principle, stored in a memory (not shown) of MPR 3. The exemplary data comprise two data MAXCPF and CPF, where MAXCPF indicates the total number of CPRs in an exchanger and CPF indicates the number of CPRs in the exchanger to which the next call processing is assigned. Accordingly, the MAXCPF is constant unless the configuration of the exchanger is changed. Since there are three (3) CPRs 2a, 2b and 2c in the schematic configuration shown in FIG. 4, MAXCPF is set to 3 here. CPF, the call processing assignment flag, currently indicates #2 for 2b, but it changes cyclically from #1 to #2 to #3 and then back to #1.

The call processing assignments and bandwidth controls by the MPR3 according to the first principle of the call processing assignments, as well as the call connection processings by the CPRs 2a, 2b and 2c, are explained in more detail. Here, the MPR 3 independently executes two processings (programs) of call processing assignments and bandwidth controls, and the CPRs 2a, 2b and 2c independently execute their respectively assigned call connection processings.

Figure 9:
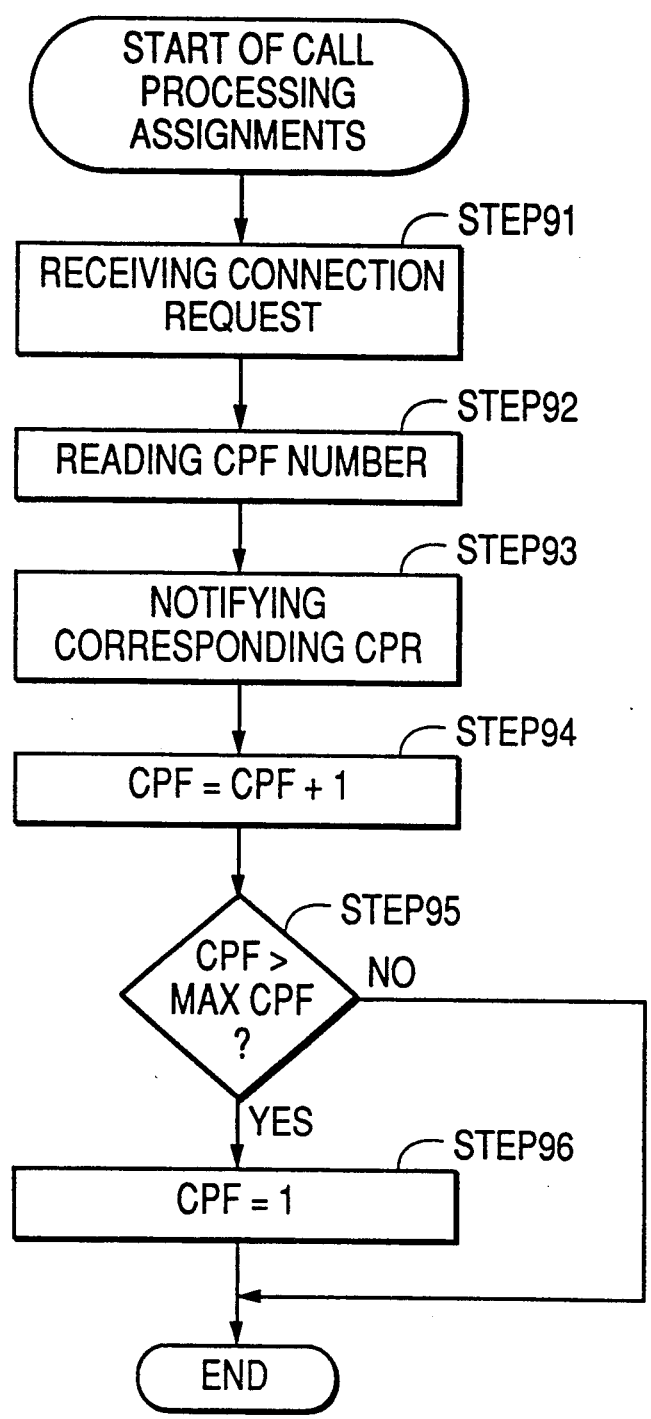
FIG. 9 is a flowchart of a call processing assignment operation executed by an MPR according to the first principle of this invention.

FIG. 9 is a flowchart of a call processing assignment operation executed by the MPR 3 according to the first principle of this invention. Described below are the operations in the flow sequence according to FIG. 9.

STEP 91: A connection request is received from the signaling device (SIG) 9. (Refer to FIG. 4.)

STEP 92: The call processing assignment flag (CPF) (Refer to FIG. 8.) is read from a memory (not shown).

STEP 93: The CPR corresponding to the number indicated by the CPF (CPR 2a for CPF #1, CPR 2b for CPF #2, and CPR 2c for CPF #3) is assigned with a call processing and receives the information necessary for the call processing, such as the VCI attached to the header of an input cell.

STEP 94: 1 is added to the CPF value, which is stored in the memory as the new CPF.

STEP 95: The CPF is compared with the MAXCPF and the processes are concluded when the CPF does not exceed the MAXCPF.

STEP 96: When the CPF exceeds the MAXCPF (Refer to FIG. 8.) read from the memory, the CPF reverts to 1, which is stored in the memory.

Figure 10:
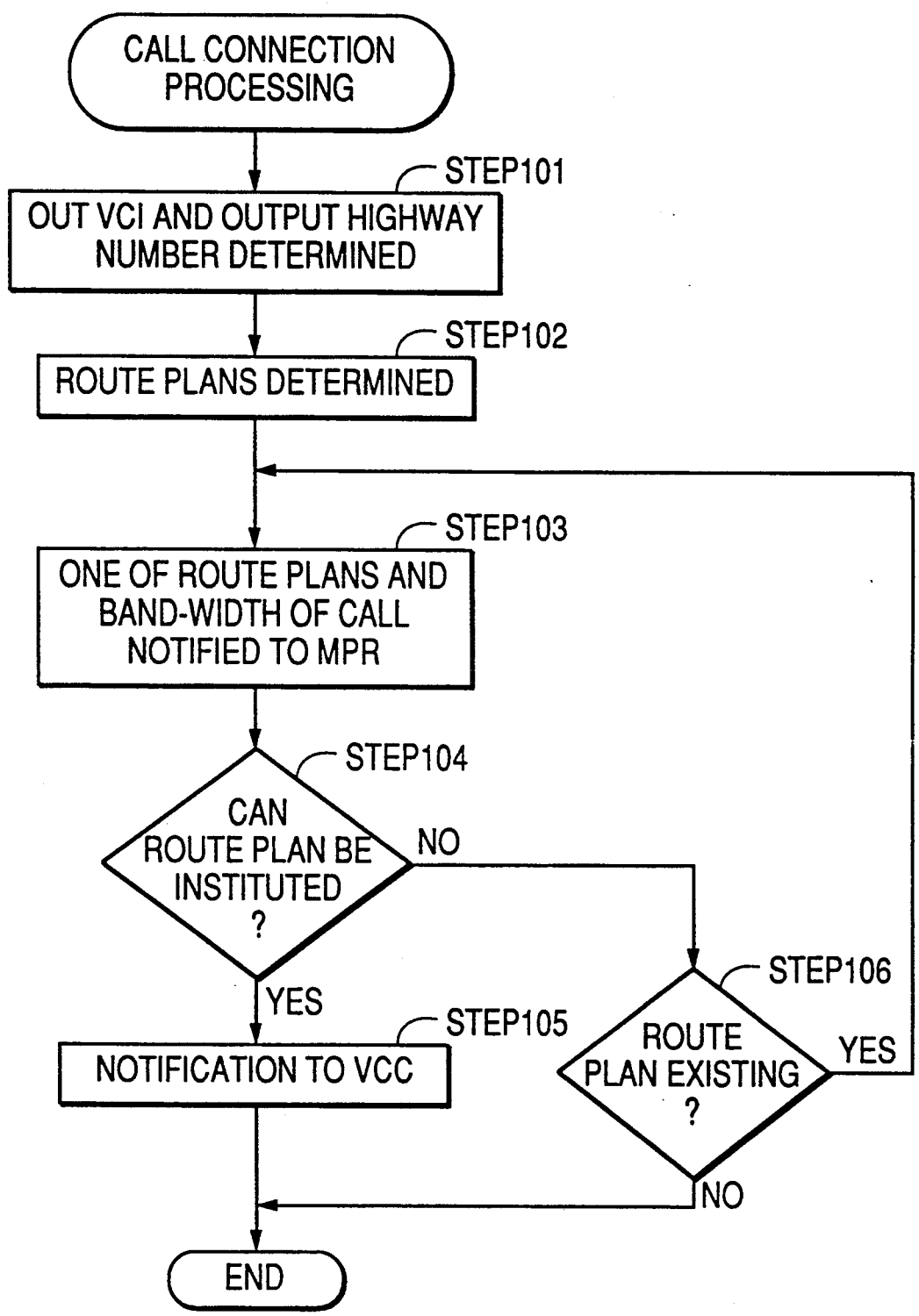
FIG. 10 is a flowchart of a call connection processing operation executed by a call processor (CPR)

FIG. 10 is a flowchart of a call connection processing operation executed by a call processor (CPR) corresponding to the value of CPF. The operation of the MPR3 assigns the call processing to the CPR, based on the actions described in the flowchart shown in FIG. 9. Described below are the operations in the flow sequence according to FIG. 10.

STEP 101: Based on the information (such as the input VCI indicating the link with the SRM in the preceding stage, the input highway number and the destination terminal number) received from the MPR 3, the new VCI indicating the link with the SRM in the succeeding stage and the output highway number are determined.

STEP 102: All possible route plans are determined from among the input highway number and the determined output highway number.

STEP 103: One of the route plans determined in STEP 102 and the bandwidth of the call to be connected are notified to the bandwidth controller (to be described later).

STEP 104: If the MPR 3 judges that the route plan can be instituted, the control moves on to STEP 105. Otherwise, it moves on to STEP 106.

STEP 105: The new VCI determined in STEP 101 and the tag information corresponding to the route plan selected in STEP 103, together with the input VCI corresponding to the calls to be connected, are notified to the VCC 6 (Refer to FIGS. 4 and 5.)

STEP 106: The control reverts to STEP 103, after the route plan, selected in STEP 102 and judged incapable of being instituted in STEP 104, is eliminated. If there is no route plan, the call being processed is not connected and the calling process is terminated.

Figure 11:
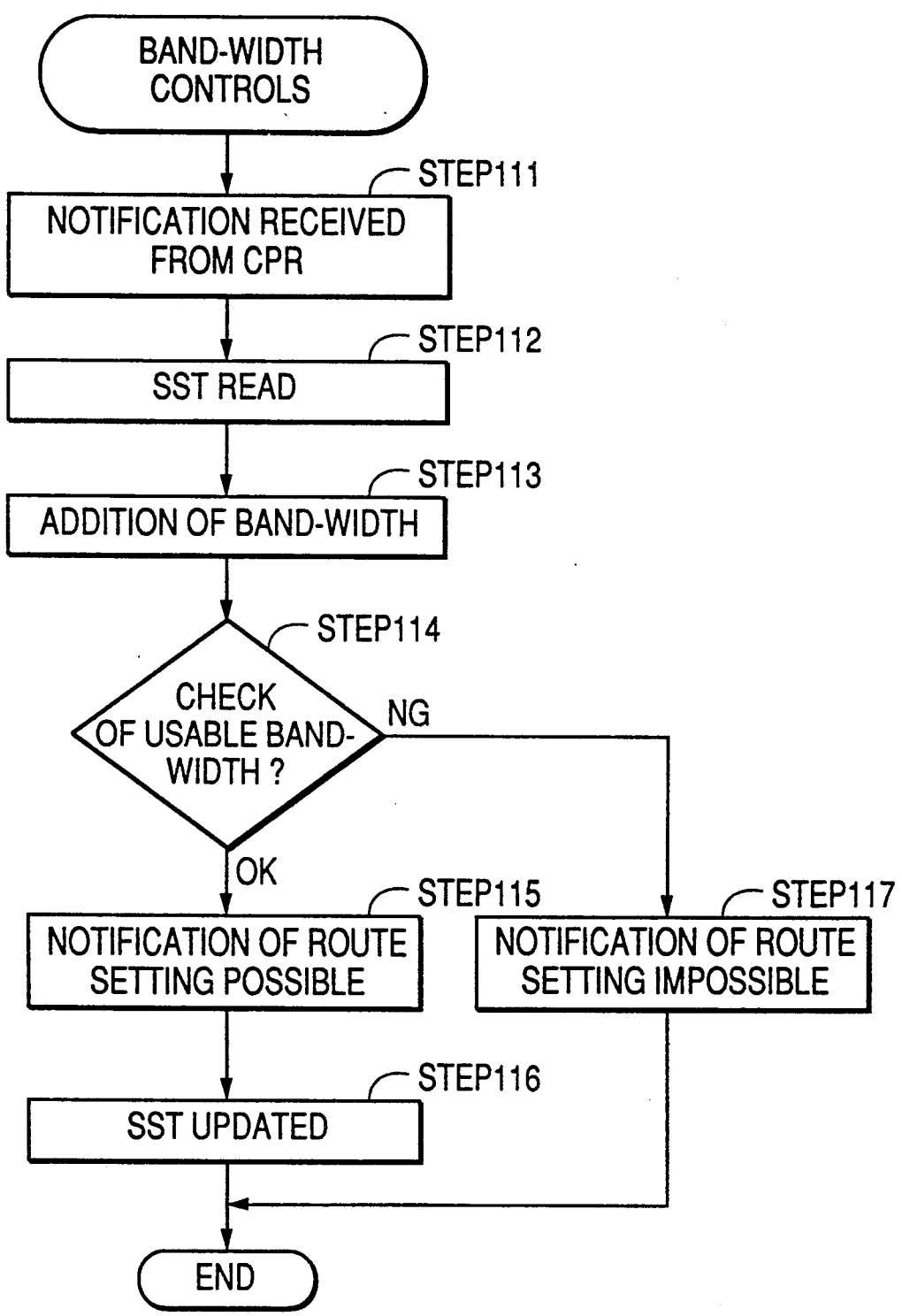
FIG. 11 is a flowchart of a bandwidth control processing operation executed by an MPR.

FIG. 11 is a flowchart of a bandwidth control processing operation executed by the MPR 3. The MPR 3 notified of the bandwidth of a call and a route plan according to the processing by a CPR in STEP 103 shown in the flowchart of FIG. 10 activates the bandwidth controller for executing the processes shown in the flowchart of FIG. 11, and notifies the CPR of the applicability of the route plan. Described below are the operations in the sequence of the flow according to FIG. 11.

STEP 111: The MPR 3 is notified of the route plan of the MSSR 2 (Refer to FIG. 4.) selected by the CPR corresponding to a CPF, i.e. the transmission path through the crossing points of the three stage SRMs over which a cell in a call is transmitted, and the size of the bandwidth occupied by the call.

STEP 112: The content of the switching state control table (SST) is read. (Refer to FIG. 7.)

STEP 113: The bandwidth value of the call connected by the CPR corresponding to a CPF is added to the used bandwidth value read from the SST corresponding to respective crossing points on the route plan obtained from the CPR corresponding to the CPF.

STEP 114: It is judged whether or not respective bandwidths in use obtained from the addition performed in STEP 113 exceed the maximum bandwidth MAX usable for switching read in STEP 112.

STEP 115: If there is no crossing point whose usable bandwidth exceeds the MAX, the CPR corresponding to the CPF is notified that the route cannot be set.

STEP 116: The content of the SST shown in FIG. 7 is updated according to these usable bandwidth values.

STEP 117: If there is any crossing point whose usable bandwidth exceeds the MAX, the CPR corresponding to the CPF is notified that the route cannot be set.

The above bandwidth controls and call processing assignments performed by the MPR 3 according to the first principle of the call processing assignments, as well as a concrete example of the call connection processing by a CPR is described below as procedures (1) through (16).

(1) The signaling device (SIG) 9 notifies the MPR 3, over the common bus 8 shown in FIG. 4, of a request to connect a call to a desired destination terminal number and the input VCI(=3). The call is assumed to be routed to input highway IHW #0 in the MSSR 7.

(2) The MPR 3 activates the call processing assignments shown in the flowchart of FIG. 9.

(3) The MPR 3 refers to a CPF stored in a memory, not shown in the drawings. (Refer to FIG. 8.) If the CPF value is 3, the MPR 3 notifies CPR 2c corresponding to the CPF, over the common bus 8, of the information necessary for the call processing, such as the input VCI and the destination terminal number.

(4) The MPR 3 terminates its call processing assignments.

(5) Based on the notification in procedure (3), the CPR 2c corresponding to the CPF value 3 activates the call connection processings shown in the flowchart of FIG. 10.

(6) The CPR 2c corresponding to the CPF value 3 determines the output VCI and the output highway number OHW (#2, for instance), based on the information notified in procedure (3).

(7) The CPR 2c corresponding to the CPF value 3 determines the possible route from IHW #0 to OHW #2. (Refer to FIGS. 4 and 5.) In the above example, the possible routes are as follows.

Route plan 1: $S_{00}$, $C_{00} \rightarrow S_{01}$, $C_{01} \rightarrow S_{12}$, $C_{01}$
Route plan 2: $S_{00}$, $C_{01} \rightarrow S_{11}$, $C_{01} \rightarrow S_{12}$, $C_{10}$ (8) The CPR 2c corresponding to the CPF value 3 notifies the MPR 3 of route plan 1 and the bandwidth (e.g. 100Mbps) of a call and waits for the reply on the applicability of route plan 1.

(9) Upon being notified by the CPR 2c, the MPR 3 activates the bandwidth controller shown in FIG. 11.

(10) The MPR 3 reads, from the switching state control table (SST) shown in FIG. 7, the respective bandwidths used by the crossing points in route plan 1 notified in procedure (8).

(11) If, for instance, $S_{00}$, $C_{00}=30$, $S_{01}$, $C_{01}=45$, and $S_{12}$, $C_{01}=10$, are read from the SST as a result of procedure (10), the MPR 3 adds to these values 100, which is the bandwidth of the call to be connected.

(12) Since the bandwidth at no point exceeds the MAX(=150) as a result of procedure (11), the MPR 3 judges that the present route plan is appropriate and writes new values in the SST. That is, $S_{00}$, $C_{00}=130$, $S_{01}$, $C_{01}=145$, and $S_{12}$, $C_{01}=110$.

(13) The MPR 3 notifies the CPR 2c corresponding to the CPF value 3, over the common bus 8, of the permission for a call connection.

(14) The MPR 3 terminates its bandwidth controls.

(15) Upon being notified of the permission for a call connection, the CPR 2c corresponding to the CPF value 3 notifies the VCC 6, over the SP bus 12 shown in FIG. 4, of the output VCI and the tag information being route setting data, together with the input VCI corresponding to the call to be connected. Thus, the VCC 6 finalizes the content of the VCI conversion table corresponding to the tag information and the output VCI for an input VCI.

(16) The CPR 2c corresponding to the CPF value 3 terminates its call connection processings.

Embodiments of this invention according to the second principle of the call processing assignments are explained in further detail. FIG. 12 shows an embodiment of a call processing assignment table provided in a memory of an MPR according to the second principle of this invention.

An embodiment according to the second principle of the call processing assignments is equipped with a call processing assignment table (ATBL), as shown in FIG. 12, in a memory (not shown) within the MPR 3, instead of the data for call processing assignments according to the first principle shown in FIG. 8. The call processing assignment table (ATBL) is equivalent to the call processing assignment table memory 5 according to the second principle of this invention shown in FIG. 3B and is provided inside the MPR 3, together with the switching state controller 4. The ATBL comprises values for the input VCIs (hereafter called IVCIs), which are virtual channel identifiers attached to the calls requesting connections, and values for CNO, which are numbers of the call processors (CPRs) assigned with the processings of the calls corresponding to respective IVCIs. In the example shown in FIG. 12, there are six (6) IVCIs 1 through 6. For instance, the processings of connecting the call with its IVCI value 3 are assigned to the CPR with its CNO value 2. As described later, the the MPR 3 adjusts the loads for the respective CPRs by updating the content of the ATBL.

Now an embodiment of the call processing assignments performed by the MPR 3 according to the second principle is explained in more detail. The bandwidth controls by the MPR 3 and the call connecting processes by a CPR are essentially similar to those processes based on the flowcharts shown in FIGS. 10 and 11, explained for the embodiment according to the first principle of the call processing assignments.

Figure 13:
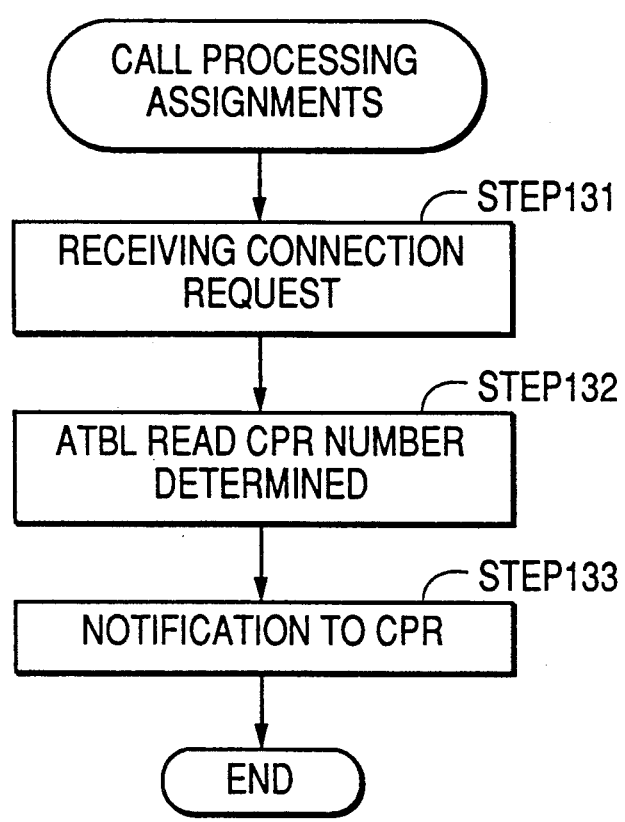
FIG. 13 is a flowchart of a call processing assignment operation executed by an MPR according to the second principle of this invention.

FIG. 13 is a flowchart of a call processing assignment operation executed by an MPR according to the second principle of this invention. Described below are the operations in the sequence of the flow according to FIG. 13.

STEP 131: The MPR 3 receives connection request from the signaling device (SIG) 9. (Refer to FIG. 4.)

STEP 132: The MPR 3 determines the particular CPR to which call processings are assigned by referring to the ATBL shown in FIG. 12 with the input VCI (IVCI) of the call requesting a connection.

STEP 133: The MPR 3 receives information necessary for the call processing e.g. of the VCI attached to the header of the input cell in correspondence with the particular CPR determined in STEP 132.

As shown in the above flow, according to the second principle of the call processing assignments, by using the ATBL such as that shown in FIG. 12, the MPR 3 performs a control to realize proper load distributions among all pertinent CPRs. Here, the MPR 3 adjusts the load for respective CPRs by updating the content of the ATBL according to the traffic condition in the network. For instance, the MPR 3 determines the content of ATBL according to the content of the switching state control table (SST) shown in FIG. 7. Alternatively, the MPR 3 determines the content of the ATBL, so that frequently used IVCIs are assigned to different CPRs as much as possible.

What is claimed is:

1. A controller apparatus for distributing loads among call processors by controlling load distributions among the call processors and controlling a switching network having a plurality of buffers for switching call processings in an asynchronous transmission mode broadband exchanger, said controller apparatus comprising:

first call processing assigning means for assigning originated call processings to said call processors in an originated-call sequence; and switching state controlling means, operating in a control state, for controlling respective usages of the plurality of buffers comprising said switching network for switching said originated all processings, wherein said call processors to which the originated call processings are assigned by said first call processing assigning means perform call processings responsive to the control state of said switching state controlling means.

2. A controller apparatus for distributing loads among call processors according to claim 1, wherein:

said first call processing assigning means and said switching state controlling means are implemented by a main processor connected to said call processors; and said call processors respectively perform the call processings by communicating with said main processor.

3. A controller apparatus for distributing loads among call processors according to claim 2, wherein:

said first call processing assigning means stored information for identifying one of the call processors to which the call processings are assigned next; an said first call processing assigning means assigns the call processing to each of the call processors identified by said information for each call and updates said information.

4. A controller apparatus for distributing loads among call processors according to claim 2, wherein said switching state controlling means comprises:

a switching state control table having a content and controlling bandwidths used by said plurality of buffers comprising said switching network; and bandwidth controlling means for determining applicability of route plans by determining the bandwidths to be used by each of said plurality of buffers corresponding to said route plans, responsive to said route plans received from said call processors, the bandwidths occupied by calls to be connected, and the content of said switching state control table, and said bandwidth controlling means for notifying said call processors of said applicability of the route plans received from said call processors.

5. A controller apparatus for distributing loads among call processors according to claim 4, wherein said bandwidth controlling means;

reads the bandwidths used by the buffers on the route plan received from said call processors stored in said switching state control table;

adds a call bandwidth to be occupied by one of the calls to be connected received from said call processors to said bandwidths used by said buffers read from said switching state control table to generate a sum; and determines the applicability of said route plans by determining whether the sum exceeds a maximum usable bandwidth.

6. A controller apparatus for distributing loads among call processors by controlling load distributions among the call processors and controlling a switching network comprised of buffers for switching call processings in an asynchronous transmission mode broadband exchanger, said controller apparatus comprising:

call processing assignment table memory means for storing a table showing which of the call processors control a processing of an originated call having cells corresponding to a channel identifier attached to the cells of the originated call;

call processing assigning means for assigning originated-call processings to one of said call processors by referring to said call processing assigning table memory means with the channel identifier corresponding to the originated call; and switching state controlling means, operating in a control state, for controlling respective usages of said buffers comprising said switching network for switching said originated call processings, wherein the call processors to which the originated-call processings are assigned by said call processing assigning means perform said originated call processings responsive to the control state of said switching state controlling means.

7. A controller apparatus for distributing loads among call processors according to claim 6, further comprising updating means for updating a content stored in said call processing assignment table memory means according to the control state of said switching state controlling means.

8. A controller apparatus for distributing loads among call processors according to claim 6, wherein:

said call processing assigning means and said switching state controlling means are implemented by a main processor connected to said call processors; and said call processors sequentially perform the originated-call processings while contemporaneously communicating with said main processor.

9. A controller apparatus for distributing loads among call processors according to claim 8, wherein said switching state controlling means comprises:

a switching state control table having a content and controlling bandwidths used by said buffers comprising said switching network; and bandwidth controlling means for determining applicability of route plans by determining the bandwidths to be used by each of said buffers corresponding to said route plans, responsive to said route plans received from said call processors, the bandwidths occupied by calls to be connected, and the content of said switching state control table, and said bandwidth controlling means for notifying said call processors of said applicability of the route plans received from said call processors.

10. A controller apparatus for distributing loads among call processors according to claim 9, wherein said bandwidth controlling means:

reads the bandwidths used by the buffers on the route plan received from said call processors stored in said switching state control table;

adds a call bandwidth to be occupied by one of the calls to be connected received from said call processors to said bandwidth used by said buffers read from said switching state control table to generate a sum; and determines the applicability of said route plans by determining whether the sum exceeds a maximum usable bandwidth.

* * * * *